US008864254B2

(12) United States Patent
Wilsher et al.

(10) Patent No.: US 8,864,254 B2
(45) Date of Patent: Oct. 21, 2014

(54) MULTI-FUNCTION SYSTEM FOR ERASING MEDIA PRINTED WITH THERMO-REACTIVE INK

(71) Applicant: Xerox Corporation, Norwalk, CT (US)

(72) Inventors: Michael John Wilsher, Letchworth (GB); Christopher D. Olliffe, Berkhamsted (GB); Duncan Ian Stevenson, Smallford (GB); Brian Reid, Welwyn (GB)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/716,863

(22) Filed: Dec. 17, 2012

(65) Prior Publication Data

US 2014/0168341 A1 Jun. 19, 2014

(51) Int. Cl.
*B41J 3/00* (2006.01)
*G01D 11/00* (2006.01)
*B41J 2/315* (2006.01)

(52) U.S. Cl.
CPC .................................... *B41J 2/315* (2013.01)
USPC ............................................ 347/2; 347/100

(58) Field of Classification Search
None
See application file for complete search history.

(56) References Cited

U.S. PATENT DOCUMENTS

2008/0136979 A1* 6/2008 Hoshino et al. .................. 349/1
2011/0212421 A1* 9/2011 Schwendimann et al. ...... 434/85

* cited by examiner

*Primary Examiner* — Matthew Luu
*Assistant Examiner* — Erica Lin
(74) *Attorney, Agent, or Firm* — Philip E. Blair; Fleit Gibbons Gutman Bongini & Bianco P.L.

(57) ABSTRACT

What is disclosed is a multi-function system which receives media printed with ink having thermo-reactive properties and which processes the received media such that the ink becomes visually transparent. One embodiment of the present system comprises an input tray for receiving printed media into a transport path along which the media travels. A heating element resides in proximity to that transport path for changing a temperature T of the media to $T \geq T_H$. In various embodiments, a temp-normalizing element is positioned along the transport path downstream of the heating element for changing a temperature of the media such that the media's temperature T can be normalized back to a temperature range $T_L \ll T \ll T_H$ prior to the media being deposited into an output tray such that the processed media is no longer hot to the touch. A user interface enables a user to perform various functions. Embodiments of a user interface are disclosed.

14 Claims, 16 Drawing Sheets

MULTI-FUNCTION SYSTEM FOR ERASING MEDIA PRINTED WITH THERMO-REACTIVE INK

CROSS REFERENCE TO RELATED CASES

This case is related to concurrently filed and commonly assigned U.S. patent application Ser. No. 13/716,815, entitled: “A Multi-Function Inkjet Device For Printing With Thermo-Reactive Ink”, by Wilsher et al.; U.S. patent application Ser. No. 13/716,937 entitled: “A Multi-Function System For Recovering Media Printed With Thermo-Reactive Ink”, by Wilsher et al.; and U.S. patent application Ser. No. 13/169,996 entitled: “A System And Method For Printing A Cancellation Mark On A Ticker”, by Wilsher et al.

TECHNICAL FIELD

The present invention is directed to a multi-function system which receives media printed with ink having thermo-reactive properties and which processes the received printed media such that the ink becomes visually transparent on that media.

BACKGROUND

In the field of document security and anti-counterfeiting, it is desirable to have a system which can render certain content on a document visually transparent.

BRIEF SUMMARY

What is disclosed is a multi-function system which receives media printed with ink having thermo-reactive properties and which processes that media such that the ink becomes visually transparent. The thermo-reactive properties of the ink are such that the ink is visible on the media when the media is at a temperature T in a range of $T_L<T<T_H$. The ink becomes visually transparent on the media when the media is heated to a temperature of $T \geq T_H$. The ink thereafter remains visually transparent after the media's temperature T is returned back to within that temperature range. The ink becomes visually perceptible again on the media when the media is cooled to a temperature of $T \leq T_L$ with the ink remaining visible on the media after the media's temperature T has returned back to that temperature range.

One embodiment of the present system comprises a heating element which resides in proximity to a transport path along which the media travels for raising a temperature T of the media to $T \geq T_H$. A sensor is used for sensing a temperature of the media and a controller keeps the media in proximity to the heating element such that a full change in temperature T can be effectuated. In those embodiments where the media transport path comprises a primary and secondary transport path, the print system further comprises a controller for re-directing the media from a primary transport path to a secondary transport path wherein the heating element resides. A temp-normalizing element is positioned along the transport path and downstream of the heating element for changing a temperature of the media such that the media's temperature T can be normalized back to a range of $T_L<<T<<T_H$ prior to the media being deposited into an output tray such that the processed media is no longer hot to the touch. A user interface enables a user to perform various functions as more fully described herein. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
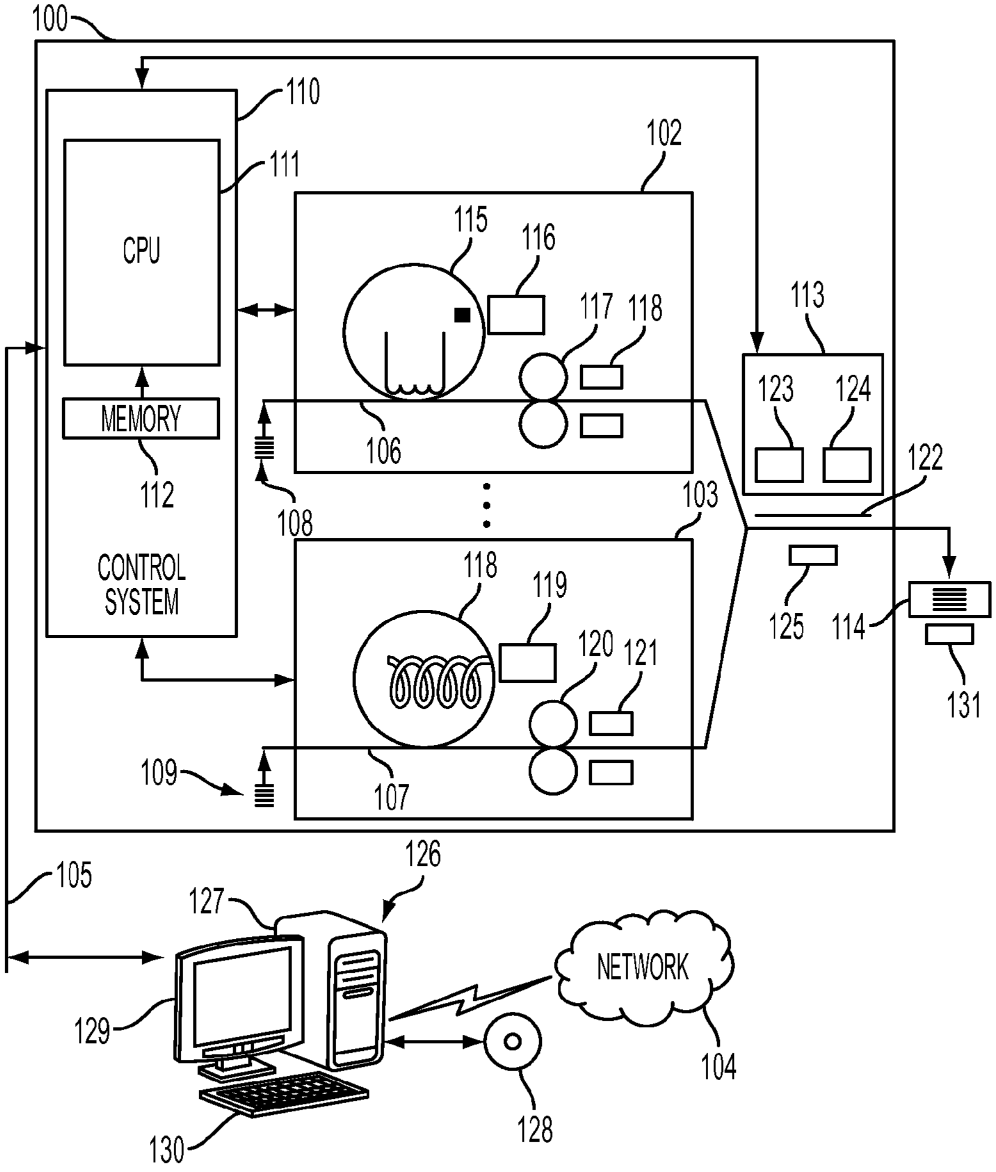
FIG. 1 shows one embodiment of a networked multi-function system in accordance with one embodiment of the present system.

What is disclosed is a multi-function system which receives media printed with ink having thermo-reactive properties and which processes the received media such that the ink becomes visually transparent.

NON-LIMITING DEFINITIONS

"Inkjet printing" employs a specially configured printhead to propel droplets of ink onto a print media. Inkjet technology was developed in the 1950s and is commonly used. There are three main types of technologies in use in contemporary inkjet devices: Continuous Inkjet (CIJ) and two forms of Drop-on-demand (DOD). In CIJ technology, a high-pressure pump directs liquid ink from a reservoir through a microscopic nozzle creating a continuous stream of ink droplets. A piezoelectric crystal creates an acoustic wave as it vibrates and causes the stream of liquid to break into droplets at regular intervals upwards of 165,000 droplets per second. The ink droplets are subjected to an electrostatic field created by a charging electrode as they form with the field varying according to the degree of drop deflection desired. This results in a controlled, variable electrostatic charge on each droplet. Drop-on-demand (DOD) technology can be divided into thermal DOD and piezoelectric DOD. Of interest here are the piezoelectric technologies, a piezo actuator is used to eject ink droplets onto the media without heating the ink. Piezo dots are printed at ambient temperature and any ink printed with such printheads will be in the stable state condition. Any of the technologies can be utilized in the embodiment dependent on the ink deposition required.

A "print media" or simply "media" refers to a substrate such as paper, on which ink is deposited by a device's printhead. Print devices generally have one or more paper trays for retaining different types of print media which include: paper, tickets, index cards, forms, and the like. A given print media has an associated set of attributes which encompass various characteristics by which media can be differentiated. A set of attributes are typically given in: type, size, color, and weight. A print media "type" attribute includes: plain, lightweight, recycled, Mylar, etc. A print media "size" attribute includes: letter, legal, A4, A5, A6, etc. A print media "color" attribute refers to the color of the media. A print media "weight" attribute has a value given in: lb, gsm, etc. For example, a given paper media may have the following attributes: type=plain, size=21.0×29.7, color=white, weight=90 lb. The print media is retrieved from a storage tray or is otherwise provided to the system by a user. The print media travels along a transport path through the print device where various system components reside such that the media can be printed or otherwise manipulated as desired. In accordance herewith, system components reside along the media's transport path to take advantage of the thermo-reactive properties of the ink printed on the media.

"Printed media" refers to a print media that has been printed with ink which has thermo-reactive properties. The printed media may also have been printed with inks which are not thermo-reactive. Various embodiments hereof receive printed media such that the ink's thermo-reactive properties can be utilized. The printed media may have already been erased, i.e., the media has been processed using, for example, the system of FIG. 1, such that the inks printed thereon have been rendered visually transparent.

A "security mark" or "validation mark" is a mark which is printed onto a media such as, for example, a ticket, at a specific location on the ticket for anti-counterfeiting purposes. An example security mark that comprises validation numbers "992935" is shown printed on secure area 1003 of the ticket of FIG. 10A. The security or validation mark may or may not be printed using ink with thermo-reactive properties. Other areas of the ticket may or may not be printed with normal permanent printing methods or thermo-reactive printing methods.

A "cancellation mark" is a mark which provides an indication that a security mark has been cancelled, i.e., indicate that the ticket has been used. The cancellation mark is typically printed on top of the security or validation mark but may be printed at a separate location on the media. The cancellation mark is preferably printed using ink with thermo-reactive properties.

"Thermo-reactive properties" refers one or more properties of an ink that change as a function of temperature such that the ink is visible on the media when a temperature T of the media is in a temperature range of: $T_L<T<T_H$. The ink becomes visually transparent on the print media when the media is heated to a temperature of at least: $T \geq T_H$. The ink thereafter remains visually transparent after the temperature T of the media is returned back to within the temperature range of: $T_L<T<T_H$. The ink becomes visually perceptible again on the media when the media is cooled to a temperature of at least: $T \leq T_L$. The ink remains visible on the media after the temperature T of the media has returned back to the range of: $T_L<T<T_H$. Various inks with thermo-reactive properties are available from different venders in commerce. In one embodiment, thermo-reactive inks comprises metamocolor Frixion® inks by Pilot® where $T_L$=−20° C. and $T_H$=65° C. Different embodiments of the systems disclosed herein utilize thermo-changing elements to effectuate a change in the transparency of the thermo-reactive ink(s) printed on the media.

A "thermo-changing element" refers to one or more elements which reside in proximity to a transport path along which the media travels for changing a temperature T of the ink/media to one or both of: $T \leq T_L$ and $T \geq T_H$. In one embodiment, the thermo-changing element comprises one or more cooling elements for lowering a temperature of the media on which the ink is printed to at least: $T \leq T_L$. In another embodiment, the thermo-changing element comprises one or more heating elements for raising a temperature of the media on which the ink is printed to at least: $T \geq T_H$. In yet another embodiment, the present system has both a heating and a cooling element residing along a same or different transport paths. Any of the thermo-changing elements may reside along a transport path at a location which is ahead (i.e., upstream) of the inkjet printhead(s) such that the thermo-reactive properties of the inks can be activated or otherwise taken advantage of, as discussed herein in detail, in advance of the media being transported to the print engine or on the output of such a print engine. A thermo-changing element may further include additional functionality such as pre-heaters or pre-coolers which help facilitate a change in the media's temperature. Pre-heating or cooling elements are not always required depending on the ink and media properties. It should be appreciated that raising/lowering the temperature of the media upon which a thermo-reactive ink has been printed effectively raises/lowers the temperature of that ink as well. Therefore, the use herein of changing the "media's temperature" means coincidentally changing the ink's temperature as well. In various embodiments hereof, the thermo-changing element comprises a drum, a roller, a coil, or a fuser in a xerographic engine.

A "temp-normalizing element" is a heating or cooling element which resides along a transport path along which the media travels, and downstream of the thermo-changing element(s) for raising/lowering a temperature of the heated/cooled media such that the temperature T of the media is normalized to a range of $T_L<T<T_H$ prior to the media being received by an output tray. In one embodiment, the temperature of the media is normalized to $T_L<<T<<T_H$, i.e., T approximates room temperature or is otherwise no longer very hot or very cold to the touch when retrieved by a user. The temp-normalizing element may comprise a heating element positioned along a transport path of the media and downstream of the thermo-changing "cooling" element such that the cooled media's temperature T can be raised to: $T>>T_L$. The temp-normalizing "heating" element may or may not be the same thermo-changing "heating" element used by the device. Likewise, a cooling element may be positioned along a transport path of the media and downstream of the thermo-changing "heating" element such that the heated media's temperature T can be lowered to: $T<<T_H$. The temp-normalizing "cooling" element may or may not be the same thermo-changing "cooling" element used by the device. An output tray of the device which receives the processed media may be specifically configured with heating and/or cooling elements to perform a temperature "normalization" function such that the media is not hot or cold to the touch when retrieved by the user. The temperature normalizing element is not always required depending on the media and ink properties.

A "multi-function system" refers to a standalone system with one or more thermo-changing elements residing along a transport path traveled by the print media. Such a multi-function system may be configured to perform one or both of: erasing media printed with thermo-reactive inks such that the ink becomes visually transparent, and recovering ink that has been erased on a printed media such that the ink become visually perceptible. One example multi-function system is shown and discussed with respect to the embodiments of FIGS. 1-6.

A "multi-function document reproduction system" refers to a printer which has an inkjet printhead for depositing thermo-reactive inks onto a media and which incorporates some or all of the functionality of the multi-function system disclosed herein. One such print system is shown and discussed with respect to FIG. 7. In a different embodiment, the system of FIG. 7 comprises a xerographic system with a xerographic engine containing a fuser, as is well understood in the document reproduction arts.

Example Multi-Function System

Reference is now being made to FIG. 1 which illustrates one embodiment of a networked multi-function system in accordance with one embodiment of the present system.

The example multi-function system 100 of FIG. 1 is shown generally comprising first and second thermo-changing elements 102 and 103, respectively, connected to a network 104 via a communications pathway 105 which may be wired or wireless. System 100 has two transport paths 106 and 107 along which the media printed with thermo-reactive ink travels. When the printed media is retrieved from tray 108, it moves along first transport path 106 and passes through or comes in proximity to a first thermo-changing element 102. In a similar manner, when the printed media is retrieved from tray 109, it which moves along transport path 107 and passes through or comes in proximity to second thermo-changing element 103. Transport paths 106 and 107 may be the same with one thermo-changing element being positioned downstream from the other thermo-changing element. The retrieved print media may alternatively be provided to the system of FIG. 1 by a user having placed the printed media into one of trays 108 and 109 or by sliding the media into a slot (not shown) which effectively places the printed media on a desired transport path. Trays 108 and 109 may be the same input tray (at 202 of FIG. 2A) for receiving a user-provided printed media. Alternatively, the user provides the media to the system and uses a user interface to signal one or more device controllers to direct or re-direct the media to a desired transport path for processing. Thermo-changing elements 102 and 103 are shown being operatively controlled by a control system 110 shown generally comprising a processor 111 and a memory 112. Memory 112 is intended to represent any type of machine readable medium such as RAM, ROM, magnetic disk or tape, optical disk, flash, holographic, USB drive, and the like. The processor retrieves machine readable program instructions from memory 112 and executes those program instructions to control various aspects of the thermo-changing elements 102 and 103, and various aspects of temp-normalizing element 113. System 100 is shown further comprising an output tray 114 for receiving the processed media.

Thermo-changing element 102 provides a means for heating the printed media such that the thermo-reactive ink on that media becomes visually transparent. Thermo-changing element 102 incorporates a drum 115 with an electro-resistive filament to pre-heat the printed media. The pre-heating drum 115 may physically contact the media or may be positioned along the transport path such that the printed media comes in close proximity thereto. Temperature sensor 116 senses a temperature of the pre-heating drum 115 and communicates that temperature reading back to control system 110. Control system 110 controls a movement of the printed media as it travels along transport path 106 such that the printed media can be kept in contact with or in proximity to pre-heating drum 115 until a temperature of the media has reached a pre-determined threshold. Thereafter, control system 110 signals one or more device controllers (not shown) to propel or otherwise move the pre-heated printed media along transport path 106 so the printed media enters or comes in close proximity to a set of heated rollers 117. As the printed media passes between the heated rollers 117, a temperature T of the media is raised. In this embodiment, temperature sensors 118 repeatedly sense a temperature of the media and communicate those readings back to control system 110. Control system 110, in response to a temperature of the media, signals device controllers (not shown) to adjust the speed of the travel of the media to regulate an exposure of the printed media to the heat from rollers 117. The media is propelled away from the thermo-changing element 102 when the ink/media have reached a desired temperature of at least: $T\geq T_H$, such that the ink on the media becomes visually transparent. In other embodiments, the control system 110 regulates the temperature of the pre-heating drum 115 and the heated rollers 117. The control system 110 may signal one or more controllers along transport path 106 to change the distance between the printed media and the pre-heating drum and/or the heated rollers such that an amount of an exposure of the media to heat from one or both of these heating elements can be changed. Upon the media exiting thermo-changing element 102, the heated media is transported along path 106 to a position 122 such that the heated media is brought into contact with or in proximity to temp-normalization element 113. In this embodiment, control system 110 communicates a signal to temp-normalization element 113 to activate cooling element 123 which cools the heated media such that a temperature T of the media is normalized to a range of $T<<T_H$, prior to the media being deposited into output tray 114. Device controllers (not shown) may be utilized to control a speed of travel of the printed media or a proximity of the printed media to cooling element 123 such that an exposure of the media thereto can be regulated as desired.

Thermo-changing element 103 provides a means for cooling the printed media such that the ink becomes visually perceptible on the media. In the embodiment of FIG. 1, thermo-changing element 103 incorporates a pre-cooling drum 118 comprising a coil of refrigerant, to pre-cool the printed media. The pre-cooling drum 118 may physically contact the media or may be positioned along the transport path such that the printed media comes in close proximity thereto. Temperature sensor 119 senses a temperature of the pre-cooling drum 118 and communicates that temperature reading back to control system 110. Control system 110 controls a movement of the printed media as it travels along transport path 107 such that the printed media can be kept in contact with or in proximity to pre-cooling drum 118 until a temperature of the printed media has reached a pre-determined threshold. Thereafter, control system 110 signals one or more device controllers (not shown) to propel or otherwise move the pre-cooled printed media along transport path 107 so the printed media enters or comes in close proximity to a set of cooled rollers 120. As the printed media passes between the rollers 120, a temperature T of the media is lowered. In this embodiment, temperature sensors 121 repeatedly sense a temperature of the media and communicate those readings back to control system 110. Control system 110, in response to a temperature of the printed media, signals device controllers (not shown) to adjust the speed of the travel of the media to regulate an exposure of the media to the cooling elements of rollers 120. The media is propelled away from the thermo-changing element 103 when the ink/media have reached a desired temperature of at least: $T\leq T_L$, such that the ink on the media becomes visually perceptible. In other embodiments, the control system 110 regulates the temperature of the pre-cooling drum 118 and the cooled rollers 120. The control system 110 may signal one or more controllers along transport path 107 to change a distance between the media and the pre-cooling drum 118 and/or the cooling rollers 120 such that an amount of an exposure of the media to cold from one or both of these cooling elements can be changed. In a manner as similarly described with respect to the thermo-changing element 102, upon the media exiting thermo-changing element 103, the heated media is transported along path 107 to a position 122 such that the cooled media is brought into contact with or in proximity to temp-normalization element 113. Control system 110 communicates a signal to temp-normalization element 113 to activate heating element 124 which heats the cooled media such that a temperature T of the media is normalized to a range of $T>>T_L$, prior to the media being deposited into output tray 114. Device controllers (not shown) may be utilized to control a speed of travel of the printed media or a proximity of the printed media to heating element 124 such that an exposure of the media thereto can be regulated as desired. Temperature sensor 125 provides temperature readings of the media (at 122) back to control system 110. Temperature sensor 131 provides temperature readings back to the user interface of the media as it resides in output tray 114.

The multi-function system of FIG. 1 is shown further comprising a computer workstation 126 which includes a hard drive (internal to computer housing 127) which reads/writes to a media such as computer readable media 128 which may comprise a floppy disk, optical disk, CD-ROM, DVD, magnetic tape, etc. Computer case 127 houses a motherboard with a processor (CPU) and memory, a communications link such as a network card, graphics card, and the like, and other software and hardware to perform the functionality of a computer system as is generally known. Workstation 126 is shown further including a user interface which, in various embodiments, comprises a display 129 such as a CRT, LCD, touch screen, etc., a keyboard 130, and a mouse (not shown). It should be appreciated that workstation 126 has an operating system and other specialized software configured to display a wide variety of data, images, numeric values, text, scroll bars, pull-down menus with user selectable options for entering, selecting, or modifying information as desired. The embodiment shown is illustrative and should not be viewed as being limited. Although shown as a desktop computer, it should be appreciated that workstation 126 can be a laptop, tablet, mainframe, client/server, or a special purpose computer such as an ASIC, circuit board, dedicated processor, or the like.

Any of the Information obtained from any of the operative modules of system 100 including various characteristics of any of the sensors thereof can be communicated to workstation 126 and displayed for a user to view. Such information may include, for instance, an amount of time the media is exposed to any of the heating and cooling elements of thermo-changing elements 102 and 103; an operating temperature of any the various heating and cooling elements of the thermo-changing elements; a temperature of the media during exposure to any of the various heating and cooling elements; and a temperature of the media as it travels along any of the transport paths 106 and 107. A user may use the keyboard of the user interface of workstation 126 to turn any of the thermo-changing elements ON/OFF; select or adjust temperatures to be applied to the media; set or adjust a temperature of any components of the thermo-changing element(s) or any of the components of the temp-normalization element(s); change a transport path along which the media travels; and change a proximity the media is to any components of the thermo-changing element(s). The user may further set an amount of time the media is in proximity to any of the thermo-changing element(s) or the temp-normalization element(s). Alternatively the described system can be reduced to a preset configuration with set modes and temperatures, which may not require all the described elements.

Any information detected or sensed by any of the controllers or temperature sensors may be communicated to a remote device over network 104 for storage, viewing, analysis, or processing. Network 104 is shown as an amorphous cloud. A detailed discussion as to the operation of any specific network or network configuration has been omitted. Suffice it to say, packets of data are transmitted over the network via special purpose devices in communication with each other via a plurality of communication links. Data is transferred between devices in the network in the form of signals. Such signals may be in any combination of electrical, electro-magnetic, optical, or other forms, and are transmitted by wire, cable, fiber optic, phone line, cellular link, RF, satellite, or any other medium or communications link known in the arts.

Any of the modules of the system of FIG. 1 are in communication with the control system 110 via communication pathways shown and not shown.

Example Standalone System

Figure 2A:
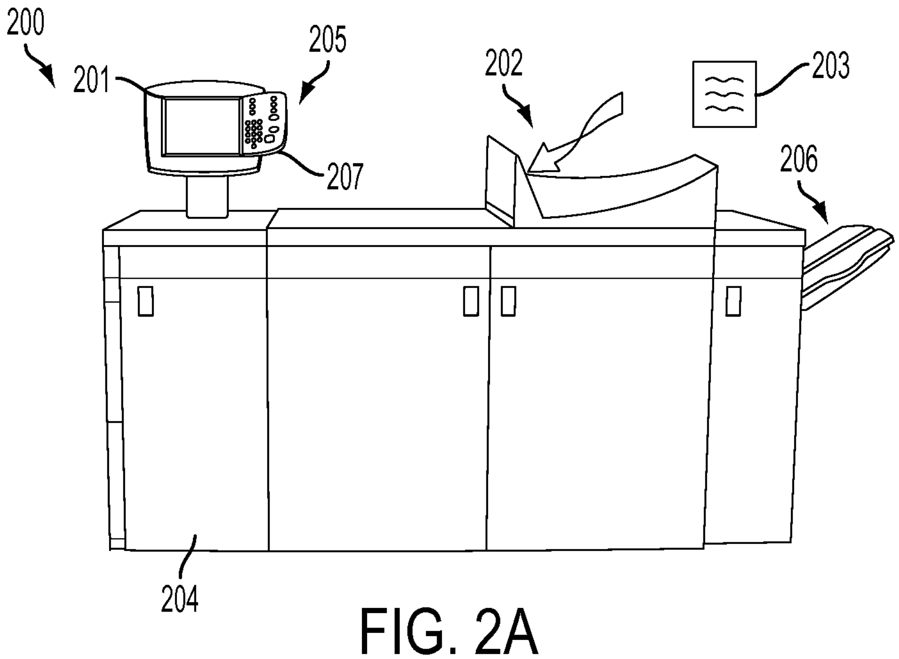
FIG. 2A shows one embodiment of a standalone system which houses some or all of the various components of the system of FIG. 1.

Reference is now being made to FIG. 2A which illustrates one example embodiment of a standalone system which houses some or all of the various components shown and discussed with respect to FIG. 1.

The system 200 of FIG. 2A is a standalone system incorporates much or all of the functionality performed by the system of FIG. 1 but does not perform a print function, i.e., has no printhead. The system of FIG. 2A is shown comprising an input area 202 to receive printed media 203 that has been printed with thermo-reactive ink. Printed media 203 may or may not have been erased, i.e., the media processed such that the inks thereon have been rendered visually transparent. If the media has already been erased by having raised the temperature of the media to at least: $T \geq T_H$, such that the ink on the media is visually transparent then the system of FIG. 2A would contain various aspects of the thermo-changing element 102 in order to lower the temperature of the media such that the ink on the media becomes visually perceptible again, i.e., make the ink re-appear. If the media has not been erased and the ink is visually perceptible on the printed media 203 then the system of FIG. 2A would contain various aspects of thermo-changing element 103 in order to raise the temperature of the media such that the ink becomes visually transparent. Various system components of FIG. 1 are housed in access-cabinets 204 which enable a technician to open the system and service the components housed therein. In operation, a user places printed media 203 into receiving tray 202 and proceeds to make a selection from a plurality of selectable menu options displayed on user interface 205 shown comprising a LCD display 201 and a keyboard/keypad 207. As discussed with respect to the embodiment of FIG. 1, the user interface enables the user to view various operational features of the system as it performs the intended functions and to set or otherwise adjust various features and functionality of the device. Embodiments of various selectable menu options and displayed information that may be displayed on the display screen 205 of the system of FIG. 2A are discussed with respect to FIGS. 3-6. Upon completion of having heated/cooled the printed media as desired, the processed media is received by output tray 206.

Figure 2B:
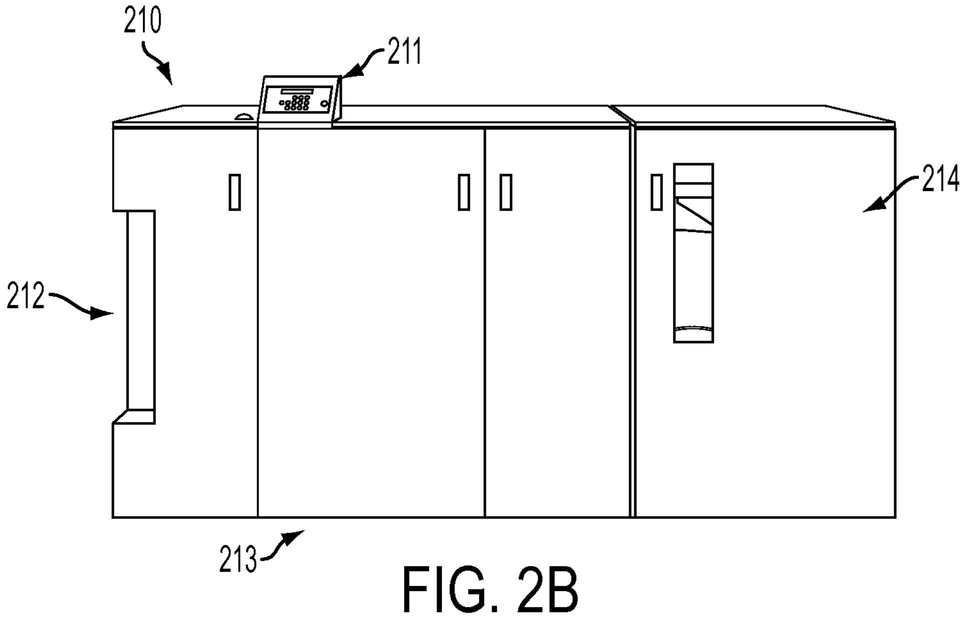
FIG. 2B shows another embodiment of a multi-function system intended to be physically joined with a print system such that the printed media is fed directly into this system for processing in accordance with the teachings hereof.

Reference is now being briefly made to FIG. 2B which shows yet another embodiment of a multi-function system 210 having a keypad 211 for enabling a user selection of the desired operations to be performed. The system of FIG. 2B is intended to be physically joined with a multi-function document reproduction device (such as media processing module 708 of FIG. 7) such that the printed media output by that document printing module 706 can be fed directly into device 210 via input area 212 wherein the printed media is received for further processing. In another embodiment, the processed media ("erased" or "recovered") is provided from device 210 to the document printing module 706 via internal transport paths (not shown) such that the processed media is moved into proximity of the device's inkjet printhead or xerographic engine. One such composite multi-function (printer or xerographic) document reproduction system is shown and discussed herein further with respect to FIG. 8. Features and functionality to "erase" and/or "recover" printed media, as discussed with respect to the embodiment of FIG. 1, are housed in cabinets 213 which enable servicing of these components by an operator or technician. The processed media is provided to output tray behind accessible doors 214.

Example User Interfaces

Figure 3A:
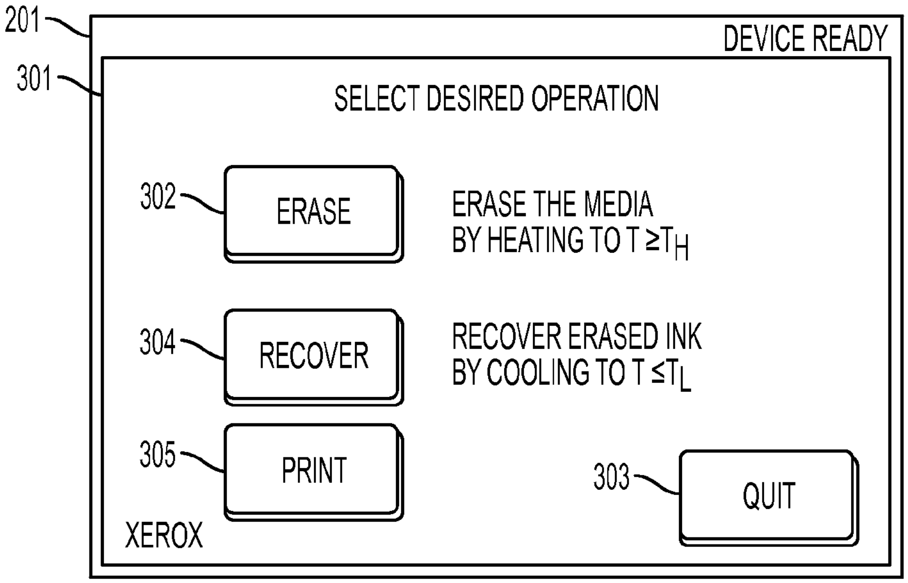
FIG. 3A shows one embodiment of the user interface of the system of FIG. 2A having displayed thereon selectable operational menu options to perform an erase function or a recover function.
Figure 3B:
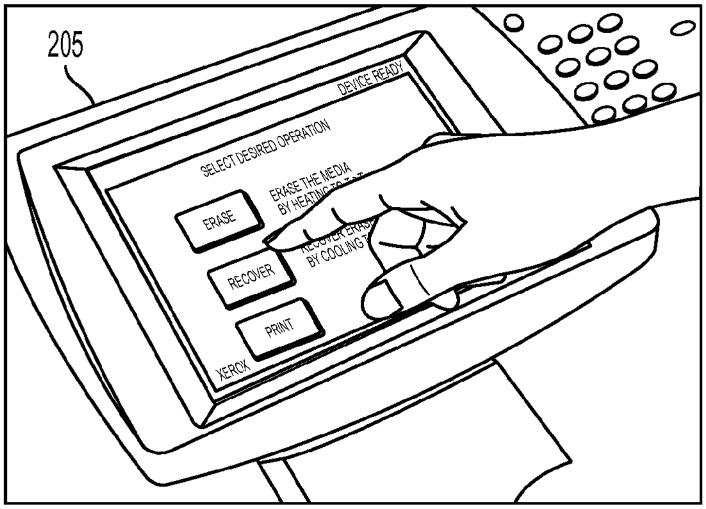
FIG. 3B shows the user making a selection from the menus of FIG. 3A.

Reference is now being made to FIG. 3A which illustrates one example embodiment of the user interface (UI) of the system of FIG. 2 having displayed thereon a plurality of selectable menu options displayed on screen 201. FIG. 3B shows the user making a selection from the menu screen of FIG. 3A.

Shown on screen 201 is a first menu 301 providing selectable options wherein the user is prompted to select the operation to be performed by the system of FIGS. 1 *and* 2. Shown are iconic buttons 302, 304 and 305, to enable the user to have the device perform an ERASE, RECOVER or PRINT function, respectively. If the user desires, for instance, to have printed media erased then the user selects the "ERASE" function 302. If the user desires to have erased ink made visually perceptible again such that the ink re-appears on the media then the user selects the "RECOVER" button 303. A PRINT button 305 is shown for those embodiments where the multifunction device is also configured to perform a print function with or without thermo-reactive inks, depending on the implementation. These user-selectable buttons signal the control system 110 of FIG. 1 to configure the appropriate transport path and set or pre-set the corresponding thermo-changing element(s) or components thereof in anticipation of the system receiving printed media 203 for processing. Also shown is a QUIT button 303 to enable the user to exit the operation or return back to a previous screen.

If the user selected, for instance, the "ERASE" button 302 then the user interface signals control system 110 to configure transport path 106 to receive the printed media 203 from the user or retrieve the printed media from input tray 108 and activate pre-heater drum 115 in anticipation of the media being received from the user. Temperature sensors 116 and 118 and other sensors along the transport path would be re-set, calibrated, or otherwise initialized in preparation of taking various respective temperature readings. The cooling element 123 of the temp-normalization element 113 would be configured to receive heated media from thermo-changing element 102 for cooling such that temperature of the media can be normalized. If, on the other hand, the user selects the "RECOVER" button 303 then, in a similar manner, control system 110 is signaled to configure transport path 107 to receive the printed media 203 from the user or retrieve the printed media from input tray 109 and activate pre-cooler 118 in anticipation of the media being received from the user. Temperature sensors 119 and 121 and other sensors along the transport path would be re-set, calibrated, or otherwise initialized in preparation of taking various respective temperature readings. Heating element 124 of temp-normalization element 113 would be configured to receive cooled media from thermo-changing element 103 for heating such that a temperature of the media can be normalized as desired.

Figure 4A:
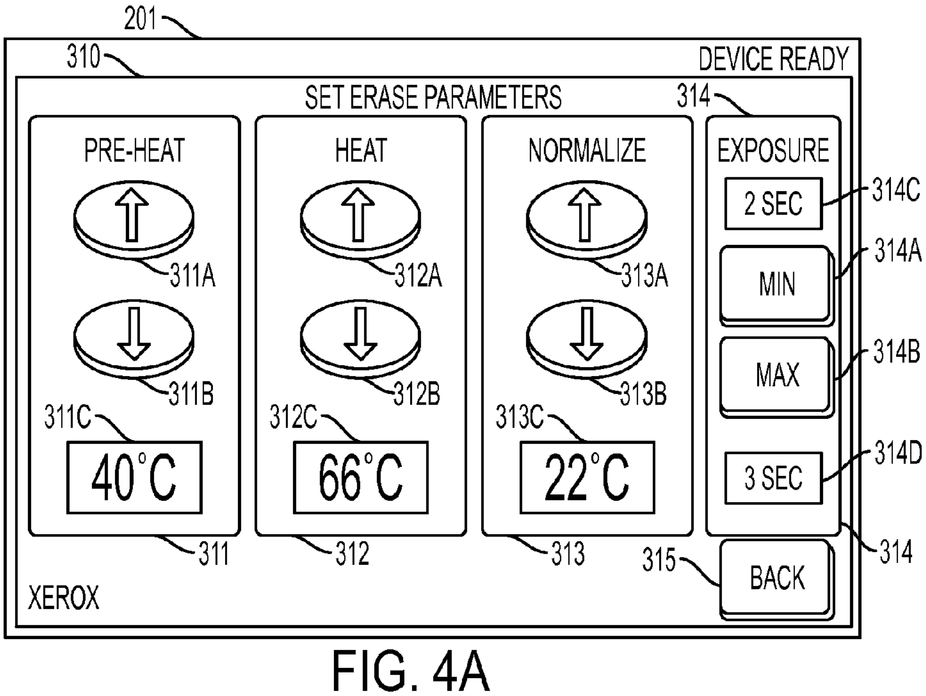
FIG. 4A shows one embodiment of the user interface of the system of FIG. 2A having displayed thereon various menu options which are displayed as a result of a user having selected the ERASE function of FIG. 3A.
Figure 4B:
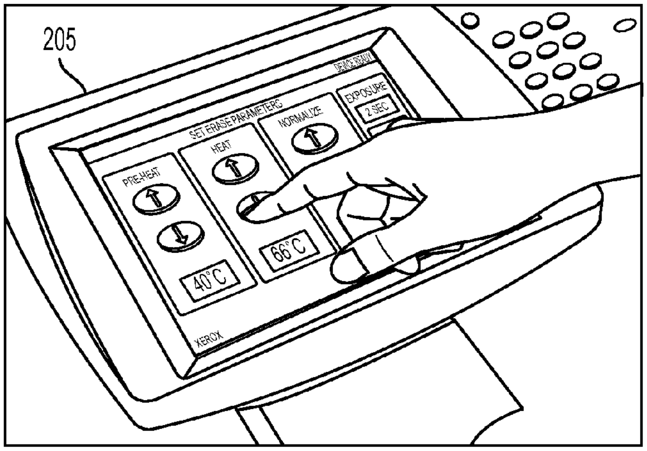
FIG. 4B shows the user making a selection from the menus of FIG. 4A.

Reference is now being made to FIG. 4A which shows one embodiment of the user interface of the system of FIG. 2 having displayed thereon various menu options 310 displayed as a result of a user having selected the ERASE function of FIG. 3A. FIG. 4B shows the user making a selection from the menus of FIG. 4A.

Shown on menu 310 are a plurality of user-selectable menu sub-sections 311, 312, 313, 314. Menu sub-section 311 provides a plurality of selectable options for enabling a user to set or adjust, in real-time, the operating temperature of the pre-heating drum 115 of the thermo-changing element 102 of FIG. 1. Buttons 311A and 311B allow the user to increase or decrease the temperature of pre-heating drum 115. A digital value of the user's desired temperature for pre-heating drum 115 is shown in display box 311C, shown displaying an example temperature of 40° C. Alternatively, display box 311C shows the current temperature of pre-heating drum 115 which the user can raise or lower using icon buttons 311A-B. As a result of the user selections of sub-section 311, a signal is communicated to control system 110 to configure the transport path 106 for an "erase" function and to set the temperature of the pre-heating drum 115 to the temperature displayed at 311C. In a similar manner, buttons 312A-B allow the user to increase or decrease an operating temperature of heating rollers 117. A digital value of the user's selected temperature is shown in digital display 312C which displays an example temperature value for $T_H$=66° C. Alternatively, display box 312C shows the current operating temperature of heating rollers 117 which the user can raise or lower. As a result of the user selections of sub-section 312, a signal is communicated to control system 110 to set the temperature of the heating rollers 117 to the temperature displayed at 312C. The menu sub-section 313 displays a similar set of iconic widgets shown as buttons 313A-B to raise and lower a desired temperature for the cooling element 123 of temp-normalization element 113. The displayed temperature is shown at 313C. Alternatively, display box 313C shows the current operating temperature of cooling element 123 which the user can raise or lower. As a result of the user making a selection in sub-section 313, a corresponding signal is sent to the control system 110 to configure the temp-normalization element 113 according to the user-provided settings. Menu sub-section 314 enables the user to set a Minimum 314A and Maximum 314B amount of exposure time that the printed media 203 is in contact with or in proximity to any of the components of thermo-changing element 102. Example values are displayed in digital display box 314C-D, respectively. Menu 310 further provides a BACK button 315 to enable the user to return to a previous menu screen. It should be appreciated that, in the absence of a user-provided value, default values are retrieved from a memory or storage device and provided to control system 110 such that a default configuration can be set or pre-set for the system sufficient to enable a "erase" function to be performed. Values and settings provided by the user may be stored in a memory or storage device for subsequent retrieval.

Figure 5A:
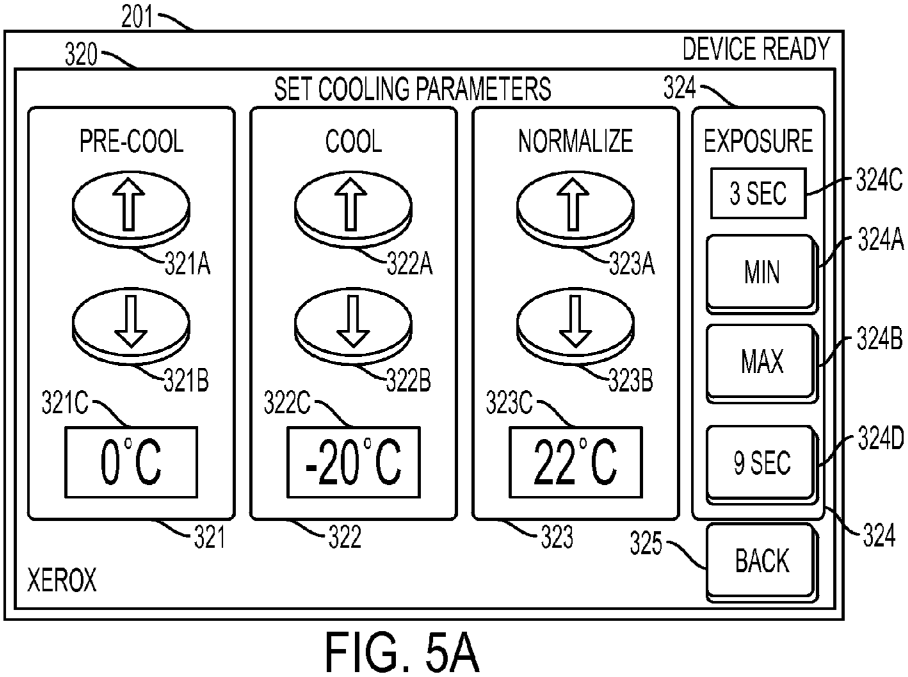
FIG. 5A shows one embodiment of the user interface of the system of FIG. 2A having displayed thereon various menu options which are displayed as a result of a user having selected the RECOVER function of FIG. 3A.
Figure 5B:
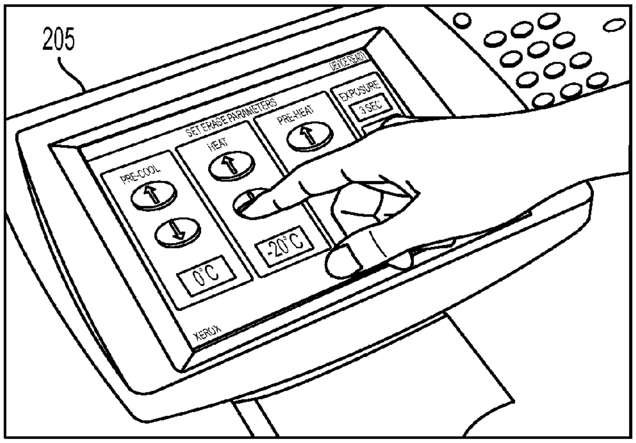
FIG. 5B shows the user making a selection from the menus of FIG. 5A.

Reference is now being made to FIG. 5A which shows one embodiment of the user interface of the system of FIG. 2 having displayed thereon various menu options 310 displayed as a result of a user having selected the RECOVER function of FIG. 3A. As stated earlier, using defined media and ink these settings are likely to be pre-set and no further user interaction would be required. FIG. 5B shows the user making a selection from the menus of FIG. 5A.

Shown on menu 320 are a plurality of user-selectable menu sub-sections 311, 322, 323, 324. Menu sub-section 321 provides a plurality of selectable options for enabling a user to set or adjust, in real-time, the operating temperature of the pre-cooling drum 118 of the thermo-changing element 103 of FIG. 1. Buttons 321A and 321B allow the user to increase or decrease the temperature of pre-cooling drum 118. A digital value of the user's desired temperature for pre-cooling drum 118 is shown in display box 321C, shown displaying an example temperature of 0° C. Alternatively, display box 321C shows the current temperature of pre-cooling drum 118 which the user can raise or lower using icon buttons 321A-B. As a result of the user selections of sub-section 321, a signal is communicated to control system 110 to configure the transport path 107 for a "recover" function and to set the temperature of the pre-cooling drum 118 to the temperature displayed at 321C. In a similar manner, buttons 322A-B allow the user to increase or decrease an operating temperature of cooling rollers 120. A digital value of the user's selected temperature is shown in digital display 322C which displays an example temperature value for $T_H$=−20° C. Alternatively, display box 322C shows the current operating temperature of cooling rollers 120 which the user can raise or lower. As a result of a user selection of sub-section 322, a signal is communicated to control system 110 to set the temperature of the cooling rollers 120 to the temperature displayed at 322C. The menu sub-section 323 displays a similar set of iconic widgets shown as buttons 323A-B to raise and lower a desired temperature for the heating element 124 of temp-normalization element 113. The displayed temperature is shown at 323C. Alternatively, display box 323C shows the current operating temperature of heating element 124 which the user can raise or lower. As a result of the user making a selection in sub-section 323, a corresponding signal is sent to the control system 110 to configure the temp-normalization element 113 according to the user-provided settings. Menu sub-section 324 enables the user to set a Minimum 324A and Maximum 324B amount of exposure time that the printed media 203 is in contact with or in proximity to any of the components of thermo-changing element 103. Example values are displayed in digital display box 324C-D, respectively. Menu 320 further provides a BACK button 325 to enable the user to return to a previous menu screen. It should be appreciated that, in the absence of a user-provided value, default values are retrieved from a memory or storage device and provided to control system 110 such that a default configuration can be set or pre-set for the system sufficient to enable a "recover" function to be performed. Values and settings provided by the user may be stored in a memory or storage device for subsequent retrieval. As stated, these settings are likely to be pre-set and no further user interaction would be required.

Figure 6:
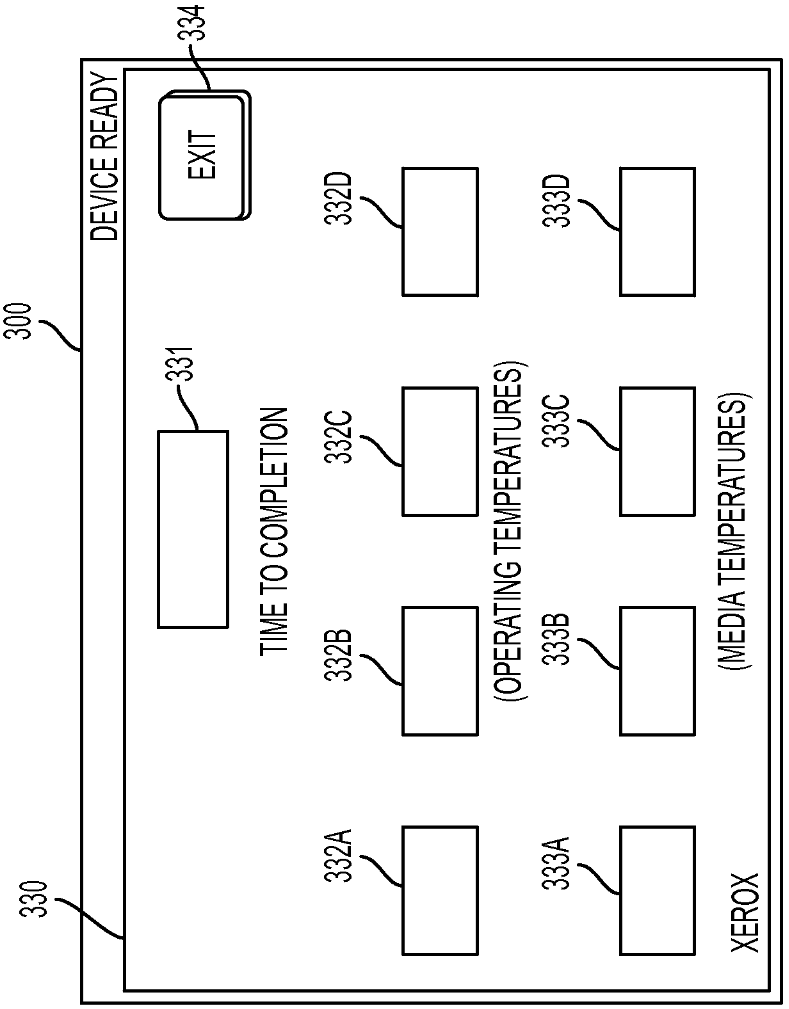
FIG. 6 shows one embodiment of the user interface of the system of FIG. 2A having displayed thereon various information for a user to view.

Reference is now being made to FIG. 6 which shows one embodiment of the user interface of the system of FIG. 2 having displayed thereon various information for a user to view.

Shown on the screen 330 are various sub-windows which display for the user the amount of time to completion (at 331) which shows, in one embodiment, an amount of time estimated to be remaining for the selected ERASE or RECOVER function. Such a time estimate would be based, at least in part, by one or more of the user selections of the associated menus when the user was configuring the job to their desired settings.

In response to the user having selected the ERASE button 302 displayed on screen 301, sub-windows 332A-D would display various operating temperatures of the pre-heating element 115 (at 332A) as sensed by temperature sensor 116, heating rollers 117 (at 332B) as sensed by temperature sensors 118, the operating temperature of the cooling element 123 of temp-normalization element 113 (at 331C) as sensed by temperature sensor 125, and a temperature of the processed media (at 332D) in output tray 114 as sensed by temperature sensor 131. Also displayed on screen 330 of FIG. 6 are four temperature readings (shown at 333A-D) of the media at different points along transport path 106. Such temperature reading are provided to the display by each of the above-described temperature sensors which are configured to also communicate temperature readings of the media along with temperature readings of each of the above described elements.

Likewise, in response to the user having selected the RECOVER button 303 displayed on screen 301, sub-windows 332A-D would display various operating temperatures of the pre-cooling element 118 (at 332A) as sensed by temperature sensor 119, cooling rollers 120 (at 332B) as sensed by temperature sensors 120, the operating temperature of the heating element 124 of temp-normalization element 113 (at 331C) as sensed by temperature sensor 125, and a temperature of the processed media (at 332D) in output tray 114 as sensed by temperature sensor 131. Also displayed on screen 330 of FIG. 6 are four temperature readings (shown at 333A-D) of the media at different points along transport path 107. Such temperature reading are provided to the display by each of the above-described temperature sensors which also communicate temperature readings of the media along with the various temperature readings of each of the above described temp-changing elements.

Shown on the screen 330 are various sub-windows which display for the user the amount of time to completion (at 331) which shows, in one embodiment, an amount of time estimated to be remaining for the selected ERASE function. Such a time estimate would be based, at least in part, by one or more of the user selections of the associated menus when the user was configuring the job to their desired settings. Sub-windows 332A-D display various operating temperatures of the pre-heating element 115 (at 332A) as sensed by temperature sensor 116, heating rollers 117 (at 332B) as sensed by temperature sensors 118, the operating temperature of the temp-normalization element 113 (at 331C) as sensed by temperature sensor 125, a temperature of the processed media (at 332D) in output tray 114 as sensed by temperature sensor 131. Also displayed on screen 330 of FIG. 6 are four temperature readings (shown at 333A-D) of the media as it travels along the desired transport path. Such temperature reading are provided to the display by each of the above-described temperature sensors which are configured to also communicate temperature readings of the media along with temperature readings of each of the above described elements.

Screen 330 further provides a selectable EXIT button 334 to enable the user to exit to a main menu. The EXIT button can be configured in software to perform any number of desired options such as, for example, shutting the system down, returning to a previous menu screen, and the like. Additional features and functionality can be added to any of the illustrated menu screens. Further, additional menu screens with other displayed information by a user and other selectable obtains may be added to provide the user with additional capabilities beyond those discussed herein depending on the nature and configuration of a multi-function system wherein these teachings find their intended uses. Such features and functionality are intended to fall within the scope of the appended claims.

Multi-Function Print Device

Figure 7:
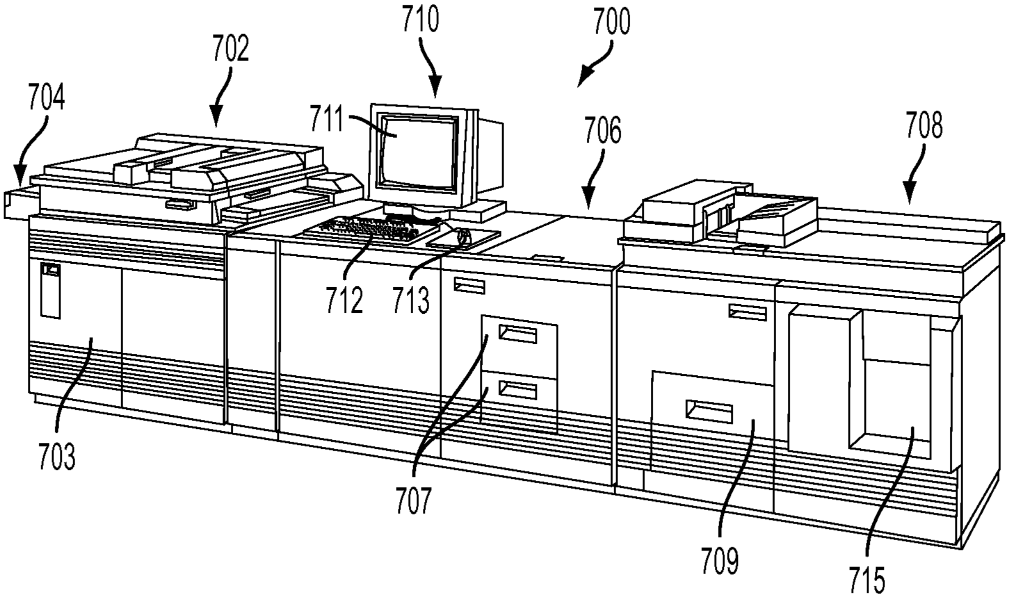
FIG. 7 shows one embodiment of a multi-function document reproduction system wherein various aspects of the system of FIG. 1 have been incorporated.

Reference is now being made to FIG. 7 which illustrates one multi-function document reproduction device 700 wherein various aspects of the system of FIG. 1 have been incorporated.

The multi-function document reproduction system of FIG. 7 includes the functionality of the multi-function system 100 of FIG. 1 and further provides a printhead which deposits ink with thermo-reactive properties onto a media. The embodiment of the multi-function document reproduction system 700 is shown generally comprising a media input module 702 where blank media to be printed are retained in a plurality of media trays accessible to the user via cabinet doors 703. The user can provide one or more printed media (intended to be "erased" or "recovered") such as printed media 203 of FIG. 2A, as input to the multi-function document reproduction system of FIG. 7 via input tray 704. Document printing module 706 of the system of FIG. 7 houses various print engines which have printheads for depositing ink with thermo-reactive properties on media retrieved from any of the media trays or provided by a user via tray 704. In the embodiment wherein the multi-function document reproduction system 700 is a xerographic device, document printing module 706 houses a xerographic engine with a fuser. In either embodiments, the printed media is deposited in output bins 707 where the document(s) can be subsequently retrieved. The document reproduction system of FIG. 7 may be configured to print in non-thermo-reactive inks as well as thermo-reactive inks. In the embodiment wherein the multi-function document reproduction system 700 is a xerographic device, document printing module 706 renders printed media using toner. A selection as to which inks/toner are to be printed on the media is made selectable by a user using computer 710 which, in this embodiment, is integral to the document printing module 706. Computer 710 includes a display device 711, a keyboard 711, and a mouse 713.

Figure 8:
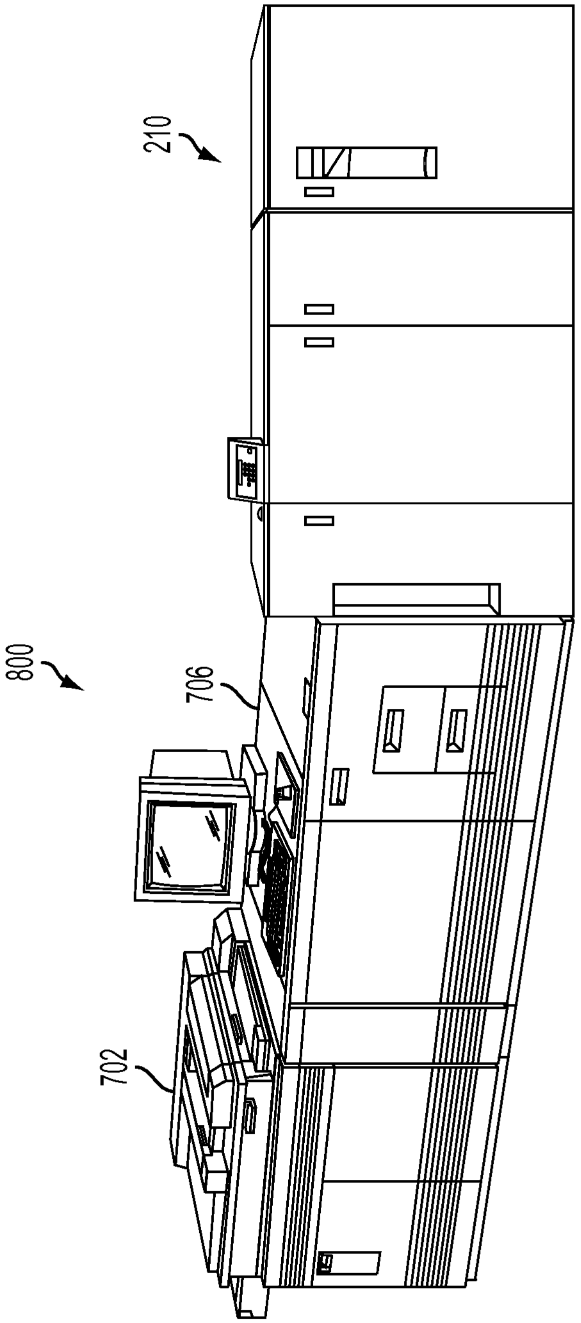
FIG. 8 shows the media input module and the document printing module of FIG. 7 having been physically joined with various aspects of the multi-function system of FIG. 2B to form a composite multi-function system.

The system 700 further generally comprises a media processing module 708 wherein various features and functionality of the system of FIG. 1 which are made accessible by a user or service technician via cabinet doors 709 which, in this embodiment, are slideably retractable such that each of the thermo-changing elements 102 and 103, respectively, can be accessed or otherwise serviced. Various menus, such as those discussed with respect to FIGS. 3-6 can be displayed on display device 711 and values can be entered by a user using the keyboard 712 and mouse 713. An operator can further use the computer workstation 710 to set various device parameters and configure various aspects of the thermo-changing and/or temp-normalization elements, temperature sensors, change transport paths, set operational parameters, and enable other document printing operations to be performed by the multi-function print device. It should be appreciated that media processing module 708 can comprise, for example, the joinable system of FIG. 2B. One such physically joined "composite" multi-function system 800 is shown in FIG. 8.

Various modules of the multi-function document reproduction systems of FIGS. 7 *and* 8 also include processors having memory and storage devices such as a disk drive for storage of programs and data required for processing documents through the system in a manner as disclosed herein. Document printing module 706 and media processing module 708 include device controllers integral to these systems for regulating the application of inks onto paper as well controlling the media moving through these various modules. These controllers may also be placed in digital communication with one or more storage devices such as a CD-ROM or magnetic disk. Device controllers and the control system 110 of FIG. 1 are designed and programmed to cause the multi-function document reproduction systems 700 and 800 to carry out various features and enhancements to any of their intended functionality and as further described with respect to the embodiments of FIGS. 1-6. A network connection (not shown) may also be provided for communicating or receiving various information and other data over a network such as an intranet or internet or for receiving device settings and configuration parameters over that network such that the document reproduction system can be configured remotely to perform any of its functions. One or more aspects of the system of FIGS. 7 and 8 may be carried out by a special purpose computer.

Example Handheld Device

Figure 9:
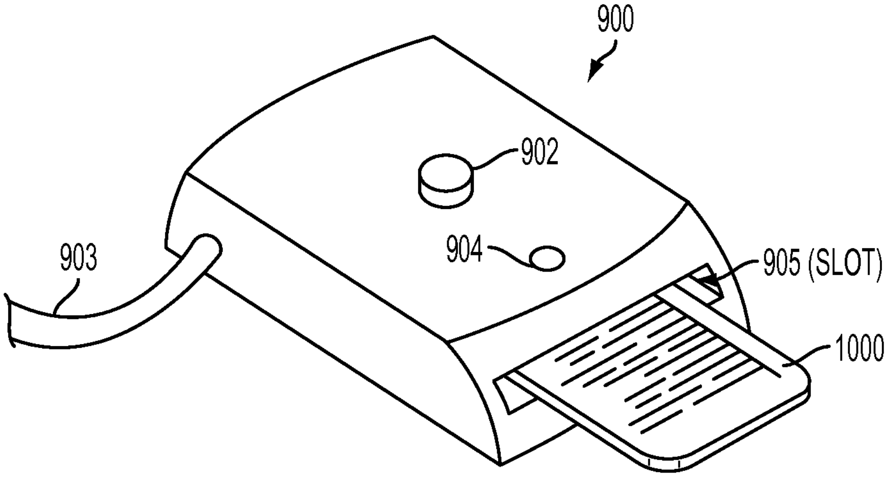
FIG. 9 shows an example handheld device which receives the ticket of FIG. 10 and performs an erase or a recover function on the ticket as shown by way of example in FIG. 10, and may be further configured to print a cancellation mark on the ticket as shown by way of example in FIG. 11.
Figure 10A:
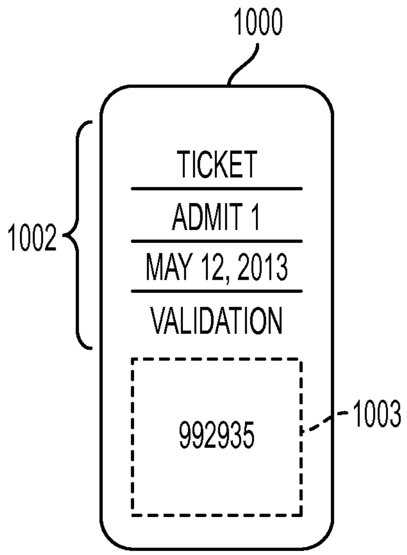
FIG. 10 shows a ticket which has a validation mark that has been printed with thermo-reactive inks (10A) and the same ticket with the validation mark having been erased (10B)

It should be appreciated that some or all of the features and functionality of the system of FIG. 1 can be made into a portable or handheld device as shown in FIG. 9. Such a handheld device 900 encompasses various aspects of the system of FIG. 1 to perform an "erase" function when button 902 is pressed. Button 902 may comprise any kind of user-activated switch. Alternatively, the erase function is performed automatically in response to the ticket having been inserted into the device. In this embodiment, a detector is used to sense the presence of the ticket as it is inserted into the device and activating the intended function. The erase function has been described with respect to thermo-changing element 102. Power to the device is provided by power cord 903 which is connected to an electrical outlet (not shown). LED light 904 lights up to provide a visual indication to the user that the erase function performed by the device has completed. In this "erase" example, ticket shown in FIG. 10A area 1000 has information (collectively at 1002) printed thereon by a printer using regular ink, i.e., ink with no thermo-reactive properties. On a secure area 1003 of the ticket of FIG. 10A is printed a validation mark shown by way of example as a number "992935". The validation mark has been printed onto secure area 1003 with thermo-reactive ink by, for example, the multi-function document reproduction system of FIG. 7. The ticket comprises printed media. The validation mark is visibly perceptible at the time the ticket was purchased and is still visible when presented at the entrance gate or door of the event. The ticket enables the ticket holder to attend the event. Operationally, at the gate or door of the event, a security agent receives the ticket presented by the ticket holder and proceeds to slide validation area of the ticket into a slot 905 of device 900 and presses button 902 such that an "erase" function can be performed on the thermo-changing ink of the validation mark. It should be appreciated that slot 905 is a transport path along which the printed media travels such that the printed media can be brought into proximity of the thermo-changing element. When the ticket has been erased, LED 904 lights up to provide a visual indication that this ticket has been effectively processed. The validation mark is no longer visibly perceptible on the ticket so that the ticket cannot be used again. Thereafter, the ticket can be retracted from the device and provided back to the user or retained.

Figure 10B:
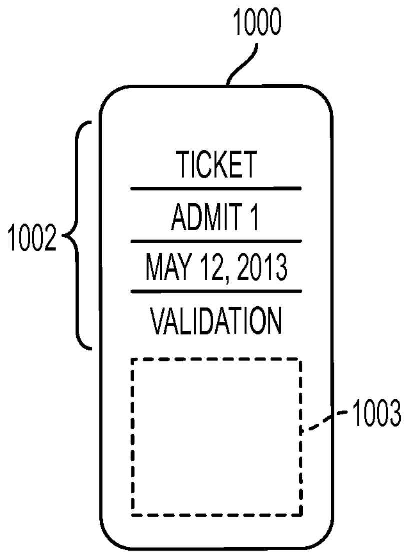

In another embodiment, the handheld device of FIG. 9 encompasses sufficient aspects of the system of FIG. 1 to perform a "recover" function as described with respect to thermo-changing element 103. Power to the device is provided by power cord 903 which is connected to an electrical outlet (not shown). LED light 904 lights up to provide a visual indication to the user that the recover function performed by the device has completed. In this "recover" example, the validation mark "992935" printed on secure area 1003 of the ticket of FIG. 10B has been erased, i.e., made visually transparent, prior to the ticket having been sold. As such, the validation area 1003 of the ticket appears empty. The validation mark is not visually perceptible when presented by the ticket holder at the entrance gate or door of the event. At the gate or door of the event, a security agent receives the ticket presented by the ticket holder and proceeds to slide the portion of the secure area of the ticket containing the validation mark into device 900 and presses button 902 such that a "recover" function can be performed of the validation mark. Alternatively, the recover function is performed automatically in response to the ticket having been inserted into the device. In this embodiment, a detector is used to sense the presence of the ticket as it is inserted into the device and activating the intended function. When the validation mark has been recovered, i.e., made visually perceptible, LED 904 lights up to provide a visual indication that this ticket has been effectively processed. Thereafter, the ticket can be retracted from the device and provide back to the user or retained. The visibly perceptible validation number can then be viewed by the security agent again and, if desired, cross-checked against a list of valid ticket validation numbers. Thereafter, the ticket is retracted from the device and provided back to the user or is retained.

Figure 11:
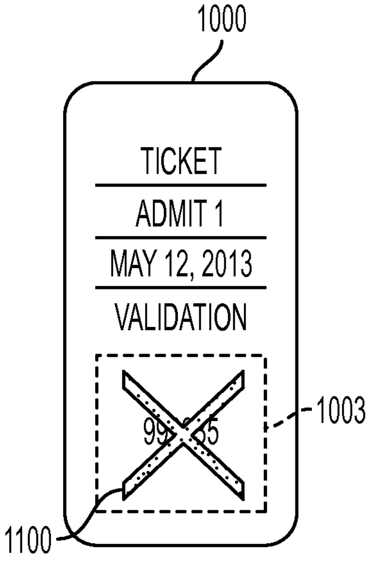
FIG. 11 shows the ticket of FIG. 10A with the validation mark having been over-printed with a cancellation stamp.

It should be appreciated that the validation mark may be cancelled by printing a cancellation mark over the security mark. For example, FIG. 11 shows the ticket 1000 of FIG. 10A with the security mark printed in secure area 1003 having a cancellation mark 1100 printed over it. In this example, the device 900 of FIG. 9 contains an inkjet printhead which is specifically configured to print a cancellation mark 1100 upon a user pressing button or switch 902. Alternatively, the cancellation mark is automatically printed by the device in response to the ticket having been inserted into the device. In this embodiment, a detector is used to sense the presence of the ticket as it is inserted into the device and activating the intended function. Light 904 blinks when the cancellation mark has been printed. The cancellation may be printed in such a manner as to overlap the validation mark (as shown) or the cancellation mark is printed in another area of the ticket. Device 900 may print the cancellation mark using regular inks or thermo-reactive inks, depending on the implementation. Upon presentation of the ticket by the ticket holder, the security agent checks the validation number and then inserts the ticket into mark cancellation device 900 and presses the button. When the light 904 blinks, the cancelled ticket can be retracted from the device and provide back to the user or retained. The "cancellation" device 900 may be configured to perform one or both of the "erase" and "recover" functions, including over-printing the validation mark.

The simple process of erasing a validation number is not totally secure as one skilled in the technology could recover the number by cooling the media. So in an additional embodiment, the ticket is printed with the fixed information (at 1002) in addition it is printed with a cancellation stamp 1100, which is then erased. Subsequently the ticket is printed with the validation code, resulting in the output shown in FIG. 10A. If the ticket is presented for entry it is erased and a blank area results as in FIG. 10B. Now if a fraudulent attempt to recover the ticket is made by cooling, not only does the validation code re-appear but so does the cancelation mark. It is not possible to recover one without the other so it is clear that the ticket has been tampered with. It should be clear to one skilled in the art that this tamper proof method using two thermo-reactive inks can be used in other applications where validation and tamper proofing is required.

Additional Features and Functionality

Figure 12:
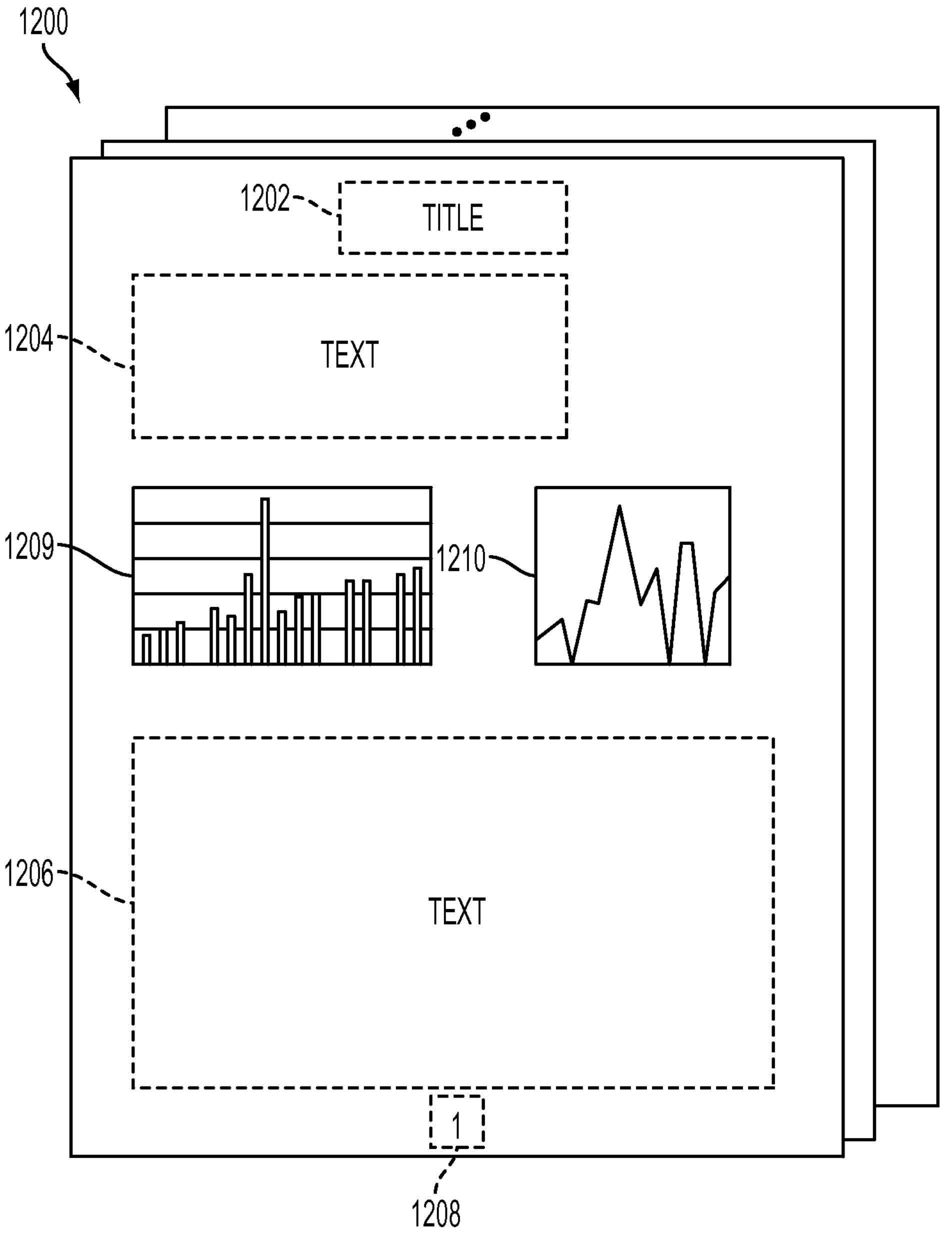
FIG. 12 shows a plurality of documents processed by the systems of FIGS. 1 and 7-8.

Reference is now being made to FIG. 12 which shows a plurality of documents processed by the systems of FIGS. 1 and 7-8 wherein various content has been printed. The plurality of documents 1200 are intended to represent example pages of an original multi-page document that contains confidential content. The dashed lines surrounding certain content displayed on the first page shows the content that has been erased using the teachings hereof. The erased content are: a title 1202, a first section of text 1204, a second section of text 1206, and a page number 1208 of the report. All this content was printed using, for example, the multi-function document reproduction system of FIG. 7 with thermo-reactive inks and further processed by the thermo-changing element 102 which performed an erase function on the document pages. Other non-confidential content namely, the first graphic 1209 and second graphic 1210 were printed with regular inks. Each of the remaining pages of the example plurality of document pages 1200 have their own respective variously printed confidential and non-confidential content. The multi-page document is made "secure" by performing an "erase" function on the document pages such that all content printed with the thermo-reactive inks is thereafter made visually transparent, as illustrated by way of example on the first page of multi-page document 1200. The processed document with the visually transparent content thereon can then be physically transported to another location. Upon receipt of the secure document by another user, the document is provided to the system of FIG. 1 which performs a "recover" function on the transparent text such that the erased content becomes visibly perceptible once again. In a further embodiment an erased item, for example 1202, could be a security mark like a watermark, but invisible. If it is desired to determine if the document is for example genuine (in this example would have an invisible mark) then the document could be subject to a recover cycle and the genuine document would show the previously invisible watermark or security feature.

It should also be appreciated that various modules of any of the systems described herein may designate one or more components which may, in turn, comprise software and/or hardware designed to perform an intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems operating in parallel. Connections between modules include both physical and logical connections. Modules may further include one or more software/hardware modules which may further comprise an operating system, drivers, device controllers, and other apparatuses some or all of which may be connected via a network. The teachings hereof can be implemented using known or later developed systems, structures, devices, and/or software by those skilled in the applicable art without undue experimentation from the functional description provided herein with a general knowledge of the relevant arts. Moreover, various aspects of the above-described systems may be partially or fully implemented in software using object or object-oriented software development environments that provide portable source code that can be used on a variety of computer, workstation, server, network, or other hardware platforms.

Example Flow Diagram

Figure 13:
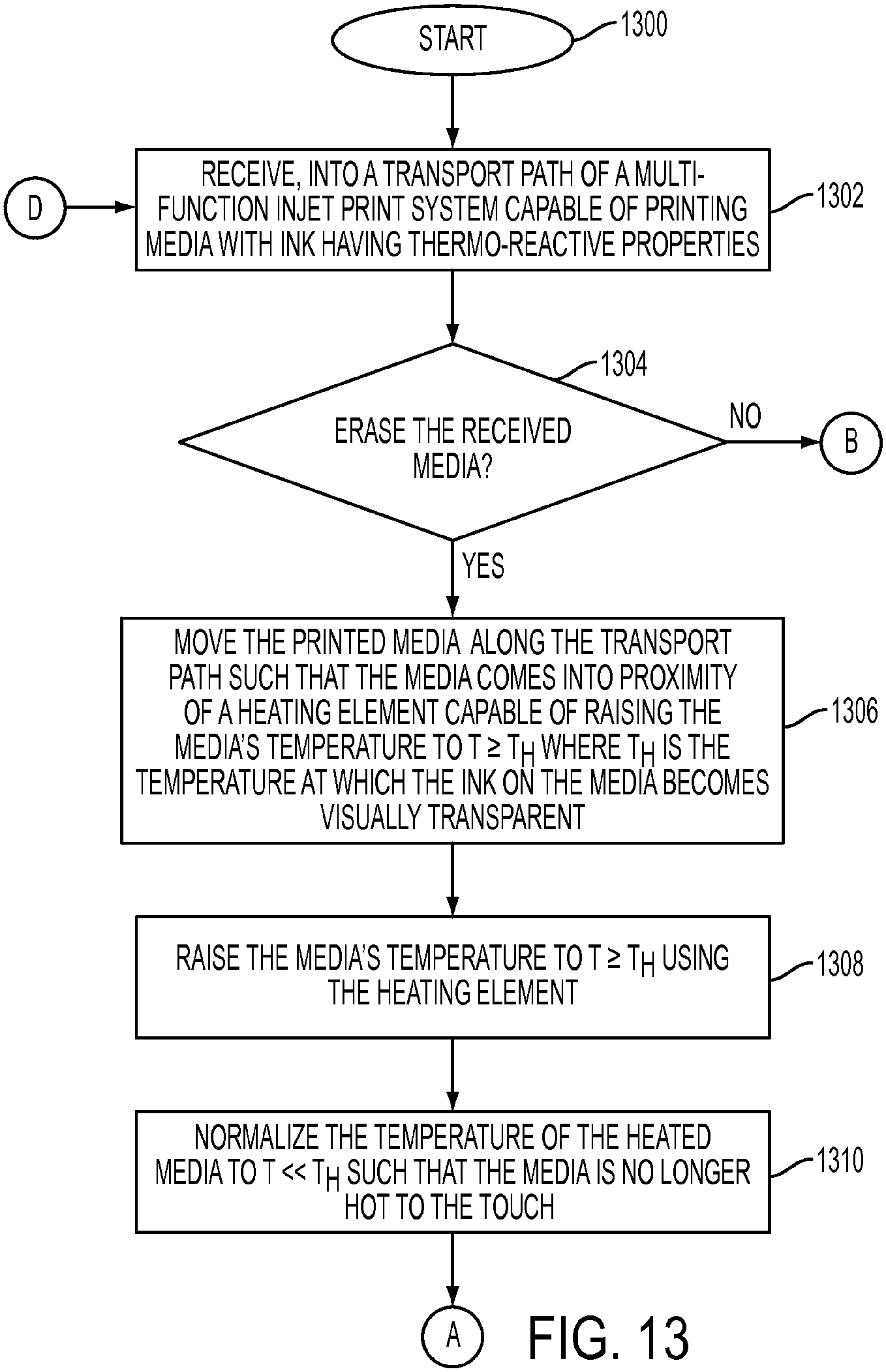
FIG. 13 is a flow diagram of one embodiment of a method for printing thermo-reactive ink onto a media using various embodiment of the print system of FIGS. 7-9.

Reference is now being made to the flow diagram of FIG. 13 which illustrates one embodiment of a method for printing thermo-reactive ink onto a media using any of the multi-function inkjet print systems described with respect to FIGS. 7-8. Flow processing begins at step 1300 and immediately proceeds to step 1302.

At step 1302, receive media into a transport path of a multi-function inkjet print system capable of printing media with ink having thermo-reactive properties, as describe here in detail. Example transport paths are shown and described with respect to the block diagram of FIG. 1.

At step 1304, a decision is made whether the media is to be erased. In this example, the media has been printed with ink having thermo-reactive properties and the user desires to have the ink printed on that media made visually transparent. Such a user-selection can be made using a user interface. Embodiments of various user interfaces are shown and discussed with respect to FIGS. 3A-B.

If, at step 1304, a user has selected to erase media then processing continues with respect to step 1306 wherein the printed media is moved along the transport path such that the media comes in proximity to a heating element capable of raising the temperature of the printed media to at least $T \geq T_H$. At step 1308, raise the temperature of the media, using the heating element, to $T \geq T_H$ such that the ink printed on the media becomes visually transparent. Once the ink printed on the media has been made visually transparent, i.e., the printed media has been "erased", processing continues with respect to step 1310 wherein the temperature of the heated media is normalized to a temperature range of $T \ll T_H$ such that the media is no longer hot to the touch. Embodiments of a temp-normalization element for lowering the temperature of heated media are shown and discussed with respect to FIG. 1.

Figure 14:
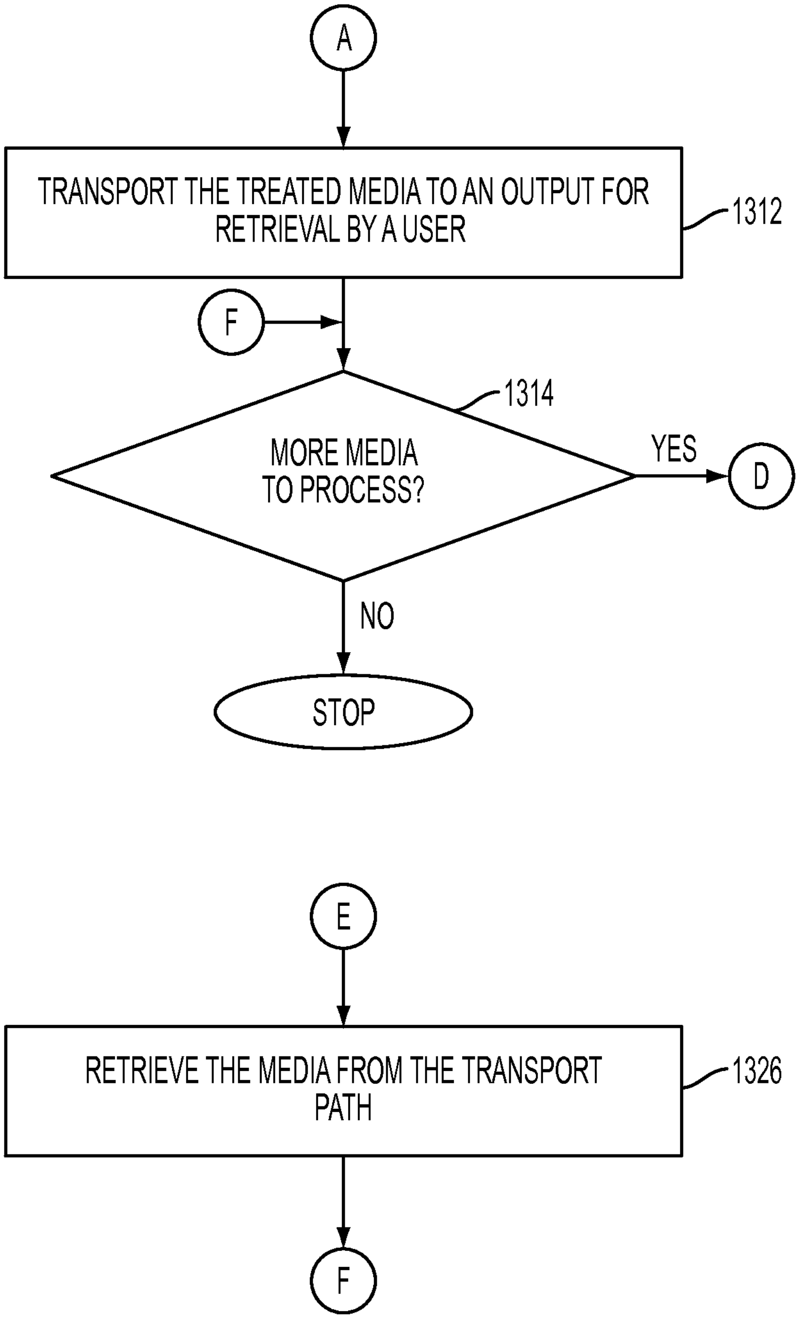
FIG. 14 is a continuation of the flow diagram of FIG. 13 with flow processing continuing with respect to node A.

Reference is now being made to FIG. 14 which is a continuation of the flow diagram of FIG. 13 with flow processing continuing with respect to node A.

At step 1312, provide the processed or "treated" media to an output tray for retrieval by a user hereof.

At step 1314, a decision is made whether any more media remains to be processed. If so then flow processing continues with respect to node D where, at step 1302, another media is provided to the transport path of the multi-function print device. If not then further processing stops.

Assume, for the discussion of this embodiment, that the user has selected, at step 1314, to process another media. The media desired to be processed has been previously printed with thermo-reactive ink which have been made visually transparent on that media using the teachings hereof. Assume further that the user desires to make the transparent ink visually perceptible again on that printed media. In this embodiment, processing continues at step 1314 with respect to node D wherein, at step 1302, the user provides the erased media to a transport path of the multi-function print system. At step 1304, the user selects that they do not wish to "erase" the media so processing continues with respect to node B of FIG. 15.

Figure 15:
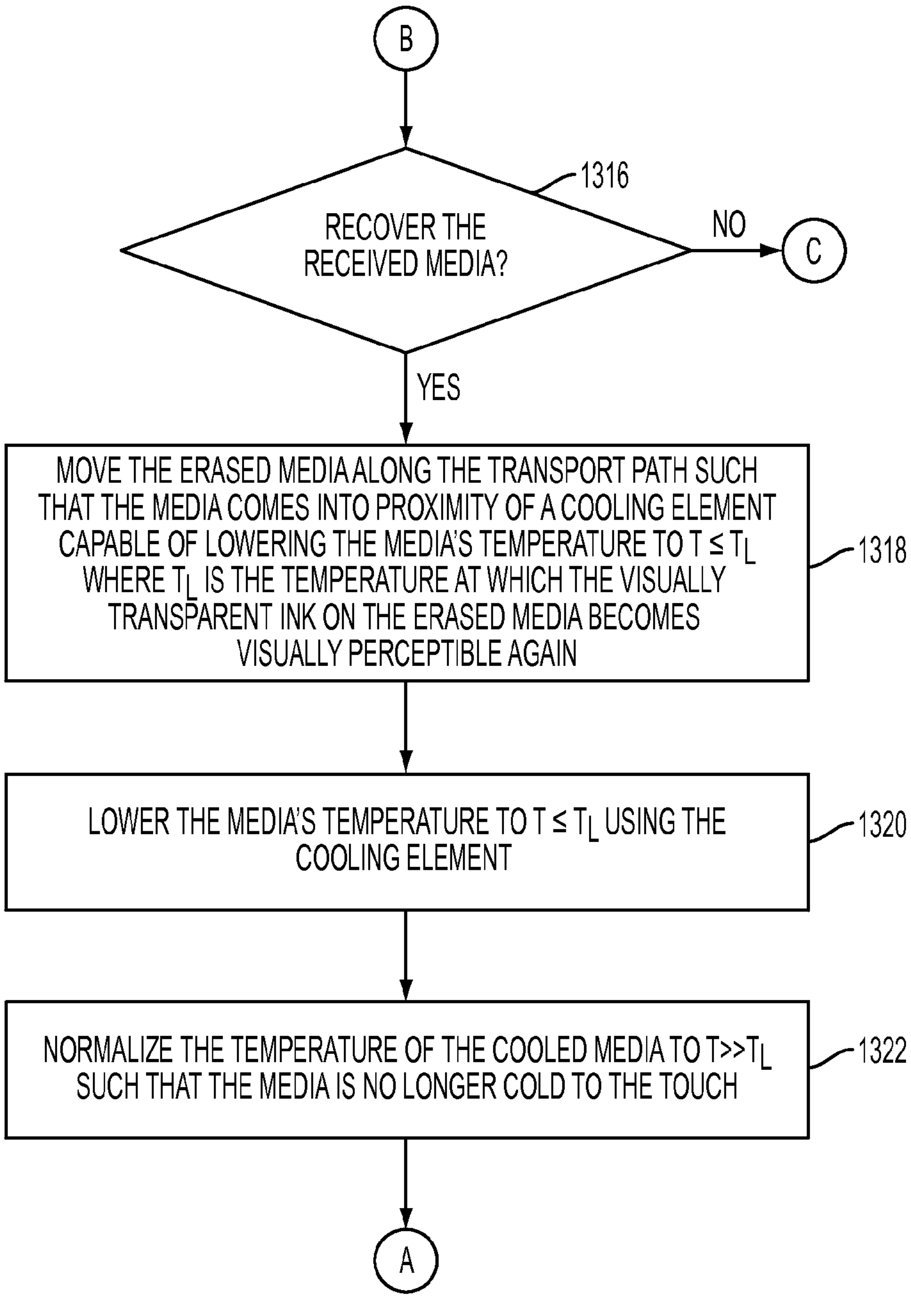
FIG. 15 is a continuation of the flow diagram of FIG. 14 with flow processing continuing with respect to node B.

Reference is now being made to FIG. 15 which is a continuation of the flow diagram of FIG. 14 with flow processing continuing with respect to node B.

At step 1316, a decision is made as to whether the user wishes to recover the received media. In this example, the user intends to recover the erased media so processing continues with respect to step 1318.

At step 1318, the erased media is moved along the transport path such that the media comes into proximity of a cooling element capable of lowering the media's temperature to $T \leq T_L$.

At step 1320, the temperature of the media is lowered to $T \leq T_L$ such that the visually transparent ink printed on the "erased" media becomes visually transparent again.

At step 1322, the temperature of the cooled media is normalized to a temperature of $T \gg T_L$ such that the cooled media is no longer cold to the touch. Embodiments of a temp-normalization element for raising the temperature of cooled media are shown and discussed with respect to FIG. 1. Thereafter, processing continues with respect to node A of FIG. 14 wherein, at step 1312, the processed or "treated" media is provided to an output tray for subsequent retrieval. Thereafter, a decision is made, at step 1314, whether the user desires to process more media.

Assume, for the discussion of this next embodiment, that the user now wishes to use the printhead of the multi-function print system hereof to deposit thermo-reactive inks onto, for example, a secure area of a concert ticket. In this instance, the user desires to print a validation mark 1003 of FIG. 10A onto ticket 1000 using thermo-reactive ink. At step 1312, the user selects that they intend to process another media so processing continues with respect to node D wherein, at step 1302, the user provides the ticket to be printed to a transport path of the multi-function print system. At step 1304, the user selects that they do not wish to have the system perform an "erase" function so processing continues with respect to node B wherein, at step 1316, the user selects that they do not wish to have the system perform a "recover" function so processing continues with respect to node C of FIG. 16.

Figure 16:
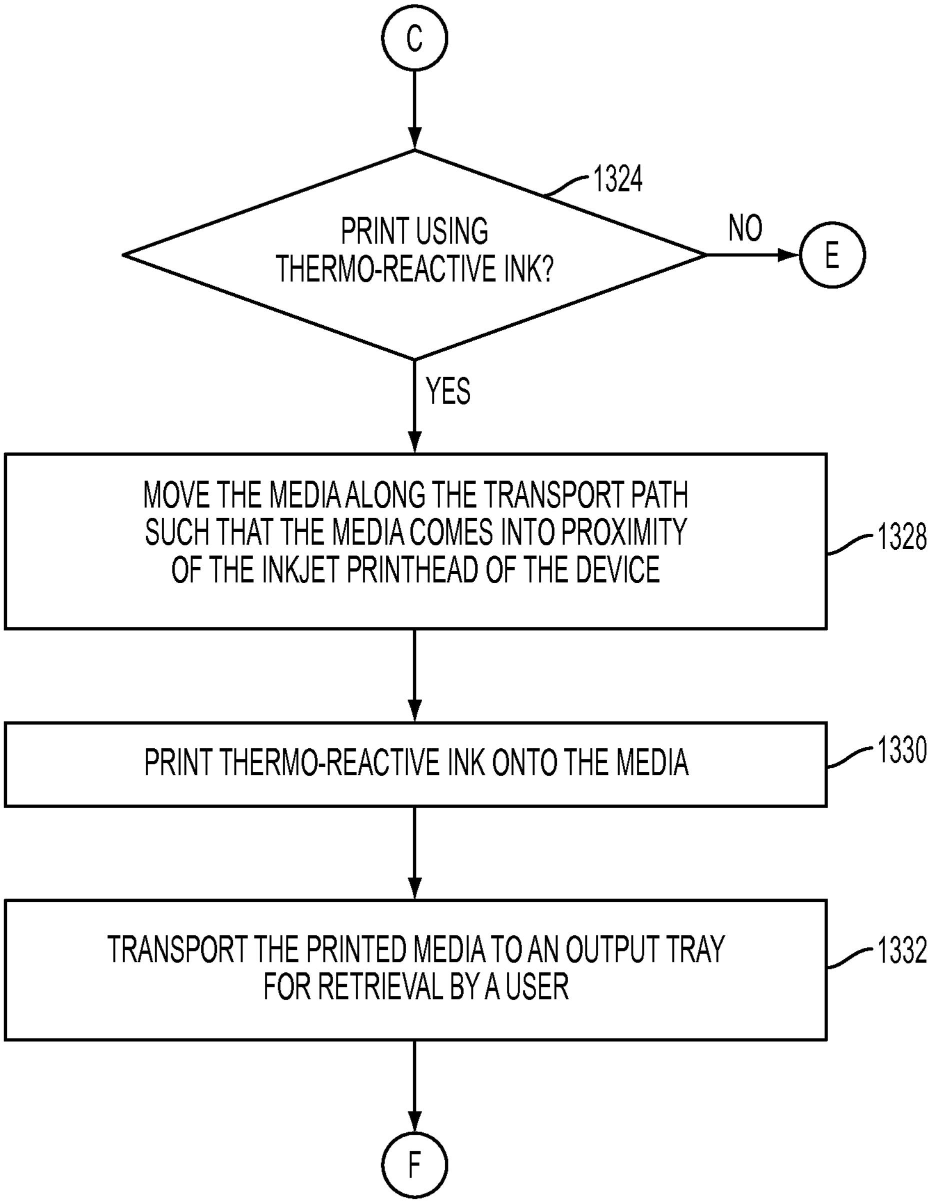
FIG. 16 is a continuation of the flow diagram of FIG. 15 with flow processing continuing with respect to node C.

Reference is now being made to FIG. 16 which is a continuation of the flow diagram of FIG. 15 with flow processing continuing with respect to node C.

At step 1324, a decision is made whether the user desires to have the multi-function print system device perform a print function using thermo-reactive inks. In this example, the user selects to perform a print function so processing continues with respect to step 1328. If, on the other hand, the user decided that they did not wish to have the multi-function print system perform a "print" function, then processing would continue with respect to node E wherein, at step 1326, the user would retrieve the media provided to the device's transport path. Processing would then continue with respect to node F wherein, at step 1314, the user would make a decision whether any more media was intended to be processed. If the user is done then further processing stops. If the user is not done then processing would continue with respect to node D wherein, at step 1302, the user would provide the next media to the transport path and processing would continue accordingly.

In this example embodiment, at step 1328, the ticket is moved along the transport path such that the ticket comes into proximity of the inkjet printheads of the multi-function print system device.

At step 1330, the printhead of the print system device deposits thermo-reactive ink onto the media.

At step 1332, the printed media is transported along the transport path to an output tray where the media awaits retrieval by the user. Processing thereafter continues with respect to node F wherein, at step 1314, the user would make a decision whether any more media was intended to be processed. If the user is done then further processing stops. If the user is not done then processing would continue with respect to node D wherein, at step 1302, the user would provide the next media to the transport path and processing would continue accordingly.

It should be appreciated that the flow diagrams herein are illustrative and are intended to explain various embodiments of the present method. One or more of the operations illustrated in the flow diagrams may be performed in a differing order. Other steps may be added such as, for instance, the step of selecting a transport path for the media to travel along, depending on the configuration of the device wherein the teachings hereof find their intended implementation. Other operations may be added or modified. Steps of the flow diagrams may be enhanced or consolidated. Such variations thereof are intended to fall within the scope of the appended claims.

Any of the above-disclosed and other features and functions, or alternatives hereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. A multi-function system for erasing media printed with thermo-reactive ink, the system comprising:

an input module for receiving a media into a transport path of a multifunction system, said media having been printed with ink having thermo-reactive properties such that said ink is visible on said media when a temperature T of said ink is in a range of $T_L<T<T_H$, said ink becoming visually transparent on said media when heated to a temperature of at least $T \geq T_H$, said ink thereafter remaining visually transparent after said temperature T returns back to within said range, said ink becoming visually perceptible again on said media when cooled to a temperature of at least $T \leq T_L$, said ink remaining visually perceptible on said media after said temperature T returns back to within said range;

at least one heating element which resides on said transport path traveled by said media and in proximity to said printed media as said media travels along said transport path, said heating element raising a temperature T of said media to at least $T \geq T_H$, such that said thermo-reactive ink printed on said media becomes visually transparent; and a controller for keeping said printed media at a distance to said heating element for an amount of time such that a change in temperature T of said ink is effectuated.

2. The system of claim 1, further comprising a sensor for sensing a temperature of said media.

3. The system of claim 1, further comprising a temp-normalizing element residing along said transport path in proximity to said media and downstream of said heating element, said temp-normalizing element changing a temperature of said media such that said media's temperature T returns a range of $T_L<T<T_H$, prior to said media being output by said system.

4. The system of claim 1, further comprising a user interface for enabling any of:

selecting to turn said heating element ON/OFF, adjusting a temperature of said heating element, changing a transport path along which said media travels, adjusting a distance said media is to said heating element, and setting an amount of time said media is exposed to said heating element.

5. The system of claim 1, further comprising a display device for viewing any of:

an amount of time said media is exposed to said heating element, a temperature of said heating element, a temperature of said media during exposure to said heating element, a temperature of said media at various locations along said transport path, and viewing a temperature of said media as it resides in an output tray of said system.

6. The system of claim 1, wherein said heating element comprises any of: a drum, a roller, and a coil, wherein an electro-resistive element is contained, and a fuser in a xerographic engine.

7. The system of claim 1, where $T_L$=−20° C. and $T_H$=65° C.

8. A method for erasing media printed with thermo-reactive ink, the method comprising:

receiving, into a transport path of a multi-function system, media printed with ink having thermo-reactive properties, said ink being visible on said media when a temperature T of said ink is in a range of $T_L<T<T_H$, said ink becoming visually transparent on said media when said media is heated to a temperature of at least $T \geq T_H$, said ink thereafter remaining visually transparent on said media after said media temperature T returns back to within said range, said ink becoming visually perceptible again on said media when said media is cooled to a temperature of at least $T \leq T_L$, said ink remaining visually perceptible on said media after said temperature T returns to within said range;

moving said printed media along said transport path such that said printed media comes in proximity to at least one heating element;

using a controller to keep said printed media at a distance to said heating element for an amount of time such that a change in temperature T of said ink can be effectuated; and using said heating element to raise a temperature T of said printed media to at least $T \geq T_H$ such that said thermo-reactive ink printed on said media becomes visually transparent.

9. The method of claim 8, wherein said multi-function system further comprises a sensor for sensing a temperature of said media.

10. The method of claim 8, wherein said multi-function system further comprises a temp-normalizing element residing along said transport path in proximity to said media and downstream of said heating element, said temp-normalizing element changing a temperature of said media such that said media's temperature T returns to a range of $T_L < T < T_H$, prior to said media being output by said system.

11. The method of claim 8, wherein said multi-function system further comprises a user interface, the method further comprising any of:

selecting to turn said heating element ON/OFF, adjusting a temperature of said heating element, changing a transport path along which said media travels, adjusting a distance said media is to said heating element, and setting an amount of time said media is exposed to said heating element.

12. The method of claim 8, wherein said multi-function system further comprises a display device for viewing any of:

an amount of time said media is exposed to said heating element, a temperature of said heating element, a temperature of said media during exposure to said heating element, a temperature of said media at various locations along said transport path, and a temperature of said media as it resides in an output tray of said system.

13. The method of claim 8, wherein said heating element comprises any of: a drum, a roller, and a coil, wherein an electro-resistive element is contained, and a fuser in a xerographic engine.

14. The method of claim 8, where $T_L = -20°$ C. and $T_H = 65°$ C.

* * * * *